United States Patent [19]

Navarro et al.

[11] Patent Number: 5,392,696
[45] Date of Patent: Feb. 28, 1995

[54] TORTILLA TRANSFER GUIDE AND METHOD FOR TRANSFERRING TORTILLAS

[75] Inventors: Francisco Navarro, Maywood; Manuel Valdez, Huntington Park; Jose M. Buendia, La Habra, all of Calif.

[73] Assignee: Machine Masters, Inc., El Monte, Calif.

[21] Appl. No.: 192,454

[22] Filed: Feb. 7, 1994

[51] Int. Cl.6 .............................. A21B 1/42
[52] U.S. Cl. .................... 99/339; 99/352; 99/355; 99/386; 99/423; 99/443 C; 99/477; 198/403; 198/560; 198/603; 414/152; 426/233; 426/502; 426/523
[58] Field of Search .............. 99/339, 352–355, 99/386, 423, 443 R, 443 C, 477–479, 483; 426/502, 439, 233, 523, 243, 496; 219/388; 198/402, 403, 560, 603, 609; 414/151, 152, 415; 126/41 C

[56] References Cited

U.S. PATENT DOCUMENTS

| | | |
|---|---|---|
| 2,112,309 | 3/1938 | Santillan . |
| 2,525,348 | 10/1950 | Glass . |
| 2,709,412 | 5/1955 | Eagerman . |
| 2,799,384 | 7/1957 | Rutherford . |
| 2,822,942 | 2/1958 | Lanham . |
| 3,478,704 | 11/1969 | Ford . |
| 3,883,283 | 5/1975 | Herrera ..................... 198/610 |
| 3,993,788 | 11/1976 | Longenecker ................ 426/502 |
| 4,154,152 | 5/1979 | Lang-Ree et al. ............ 99/386 |
| 4,309,938 | 1/1982 | Harmon ....................... 99/477 |
| 4,508,025 | 4/1985 | Schultz ........................ 99/423 |
| 4,530,632 | 7/1985 | Sela ......................... 414/788.9 |
| 4,549,477 | 10/1985 | McCabe, Jr. ................. 99/477 |
| 4,571,341 | 2/1986 | Sugimura .................... 426/523 |
| 4,600,596 | 7/1986 | Gongwer et al. ............ 99/443 C |
| 4,711,164 | 12/1987 | Mendoza ..................... 99/339 |
| 4,715,272 | 12/1987 | Mendoza ..................... 99/339 |
| 4,978,548 | 12/1990 | Cope et al. . |

Primary Examiner—Timothy F. Simone
Attorney, Agent, or Firm—Pretty, Schroeder, Brueggemann & Clark

[57] ABSTRACT

An apparatus and method for maintaining the lateral spacing of parallel rows of tortillas while transferring tortillas between two vertically spaced conveyors. The tortilla transfer guide is positioned adjacent to two generally horizontal, vertically spaced endless belt conveyors. The tortilla transfer guide has at least one scalloped section having a center of curvature aligned with the longitudinal axes respectively corresponding to an associated row of tortillas travelling towards the guide on the upper conveyor and an associated row travelling away from the guide on the lower conveyor. Each scalloped section is capable of moving a laterally misaligned tortilla towards its center of curvature, which is aligned with the proper longitudinal row axis on the lower conveyor.

13 Claims, 3 Drawing Sheets

TORTILLA TRANSFER GUIDE AND METHOD FOR TRANSFERRING TORTILLAS

BACKGROUND OF THE INVENTION

1. Field of the Invention

The present invention relates to power driven conveyors and, more particularly, to apparatus having a power driven conveyer section feeding to a gravity section feeding, in turn, to another power driven conveyer section.

2. Description of Related Art

In the commercial baking industry, the use of conveyors for the movement of tortillas is generally well known. The term "conveyor" is intended to mean any apparatus suitable for moving objects from one point to another without manual labor, including, but not limited to, an endless belt conveyor driven around two axles, one powered, or drive, axle and one non-powered, or idler, axle. The term "tortilla" as used herein is intended to refer to a piece of dough having a generally disked or other similar shape. However, while the invention is intended for use with disk shaped dough pieces, it may work with objects having other shapes, such as cakes, torts, rolls, or cookies.

Two types of apparatus which commonly utilize conveyors are ovens for the baking of food products and cooling racks for the cooling of freshly baked food products. Due to space constraints, the horizontal conveyors within these ovens and cooling racks are usually arranged in a vertically stacked, or tiered, relationship. The tortillas generally enter the tier at the top and move, in a serpentine fashion, through the tier and exit at the bottom. The horizontal component of the serpentine movement is provided by the conveyors, while the downward vertical movement is provided by a transfer guide mounted at the end of each conveyor. To facilitate the horizontal component of the serpentine movement, the upper surface of the conveyor mounted on each level of the tier moves in the opposite direction to the upper surfaces of the conveyors mounted above and below, so that the tortillas move back and forth across the length of the tier as they travel from its entrance to its exit. Each transfer guide guides the tortillas through a generally downward semicircular path to the upper surface of the next conveyor.

Generally, such automated apparatus is quite expensive, thus the production of large quantities of product is necessary to bring the per-unit cost down to a competitive level. A common method used to increase production is to widen the conveyors and to increase their velocity, so that more product can be carried at a higher speed.

An oven having a tier of endless belt conveyors is provided for in Eagerman U.S. Pat. No. 2,709,412. In this oven, the tier of parallel conveyors moves bagels, or other similarly shaped dough pieces, through the oven at a speed sufficient to allow proper baking. A semicylindrical transfer guide is provided for at the end of each conveyor so that the bagels are guided from one conveyor to the next, in sequence. To assure even baking, the transfer guide also turns the bagels over as they travel to the next lower conveyor.

The inventors have no reason to believe that the transfer guide described in the Eagerman patent is not generally effective in guiding tortillas from an upper conveyor to a lower conveyor. However, when prior art devices of that general configuration are operated under conditions intended to increase the rate of production, certain difficulties may be encountered. As described above, it is generally desirable to produce large quantities of product to hold the per-unit cost down to a competitive level. Accordingly, it is often desirable to have tiered conveyors capable of increased velocities and also wide enough to accommodate several laterally spaced rows of tortillas. One drawback of the transfer guides designed according to the prior art is the failure of the guide to correct the position of laterally misaligned tortillas.

Another drawback of the prior art transfer guides is that dough entering the guide at a high velocity may inadvertently move laterally. More particularly, when a tortilla travels at a high velocity through a downward, semi-circular turn, a variety of factors may interact to cause unwanted lateral movement. Thus, it is possible for a once properly aligned tortilla to move laterally while it is on the transfer guide. While the applicants do not precisely understand all the associated causes of the unwanted lateral movement, one cause may be unwanted acceleration forces created by high velocity circular turn. Further causes may be attributable to the vibration of or the bouncing of the tortilla against the transfer guide. Also, air resistance may induce the unwanted lateral movement through lift or drag effects.

This unwanted lateral movement may cause some of the dough to fly off of the guide and out of the tier, resulting in waste. Moreover, the unwanted lateral movement can also destroy the lateral separation between adjacent pieces of dough, resulting in undesirable bunching which may disrupt subsequent automated processes, such as stacking and packaging. Furthermore, in applications where dough pieces having large, flat surface areas, such as tortillas, must be processed, the loss of the lateral separation may result in undesirable overlapping, which could disrupt even baking or cooling.

It should, therefore, be appreciated that there still is a need for a transfer guide that successfully guides laterally spaced rows of tortillas between two conveyors so that the tortillas exit onto the lower conveyor with the proper lateral spacing. Accordingly, the present invention fulfills this need.

SUMMARY OF THE INVENTION

The present invention provides a transfer guide that successfully guides laterally spaced rows of tortillas between two conveyors so that the tortillas exit onto the lower conveyor having the proper lateral spacing between the tortilla rows. The transfer guide apparatus of the invention is for use within or in conjunction with commonly available commercial food processing equipment, such as an oven or cooling apparatus for the heating or the cooling of tortillas. By way of example, the present inventors refer to tortillas, but intend to include other similarly shaped dough pieces within the meaning of the word "tortilla."

Such processing equipment generally has a pair of generally horizontal, vertically spaced, endless belt conveyors, each passing around an associated one of two vertically spaced rollers. The tortillas are fed onto the upper conveyor for movement, in alignment with laterally spaced, longitudinal axes to dispose the tortillas in parallel rows along the upper surface of the upper conveyor. The upper surfaces of the upper and lower conveyors travel relatively toward and away from the transfer guide, respectively. The transfer guide is intended to guide the tortillas in each row from the upper conveyor to the upper surface of the lower conveyor in a manner that causes the alignment of each tortilla with one of the parallel longitudinal axes associated with the row along which the tortilla is intended to travel on the upper surface of the lower conveyor.

More particularly, the transfer guide has a vertically and laterally extending curved wall spaced from and facing towards the adjacent ends of the two conveyors. The curved wall is positioned to receive the tortillas from the upper surface of the upper conveyor and guide them down and around in a generally curved path onto the lower conveyor. The curved wall forms at least one scallop extending laterally and dished away from the adjacent conveyors. Each scallop has a center of curvature aligned with one of the longitudinal axes along which the tortillas travel in their rows. Each scallop, upon contact by a tortilla which is laterally displaced from that scallop's center of curvature, causes the tortilla to move toward its center of curvature as the tortilla passes from the upper conveyor to the lower conveyor. Thus, the scallops foster the alignment of each tortilla with the longitudinal axis of the row along which the tortilla is intended to travel on the upper surface of the lower conveyor.

The foregoing structural arrangement of the invention provides several important advantages. The most important advantage is the ability of the transfer guide to correct the alignment of laterally misaligned tortillas. As described above, it is often desirable to increase the width of conveyors to carry several rows of parallel tortillas. The proper alignment of the tortillas is then required for the accomplishment of subsequent automated processes, such as stacking and packaging. Furthermore, proper alignment of the tortillas is also needed to avoid unwanted overlapping which can interfere with proper baking or cooling. The present invention is intended to avoid such problems by advantageously maintaining the alignment of the tortillas as they travel from an upper conveyor to a lower conveyor.

More particularly, as a laterally misaligned tortilla enters a scalloped section of transfer guide, the piece will be guided, by the shape of the scallop, towards the scallop's center of curvature and will exit the transfer guide in alignment with the longitudinal axis of the proper row on the upper surface of the lower conveyor. This movement of the tortilla towards the scallop's center of curvature, while not precisely understood, may be attributable, at least in part, to several factors. One such factor may be the tangential force imparted by the scalloped wall to a laterally misaligned tortilla. This tangential force vector may cause the tortilla to move towards the scallop's center of curvature, thus ensuring proper alignment once the tortilla reaches the upper surface of the lower conveyor. A second factor may be the tendency of the tortillas to spin into proper alignment with the scallop's center of curvature. Upon impact with the transfer guide, the curvature of the scalloped wall can allow the tortilla to rotate or spin on its edge towards the center of curvature of the scalloped wall. A third possible factor may be attributable to the bouncing of the tortilla off of the scalloped wall. Upon impact with a scallop, the resilient properties of the dough may allow the tortilla to bounce toward that scollop's center of curvature.

Another advantage associated with the invention is the ability to foster the alignment of laterally spaced tortillas travelling at high velocities. As discussed above, when a tortilla travels at a high velocity through a downward, semi-circular turn, a variety of factors may interact to cause unwanted lateral movement. Thus, it is possible for a properly aligned tortilla to move laterally while it is on the transfer guide. Once again, due to the tendency of the tortilla to move towards the center of curvature of the scallop, the present invention advantageously offsets any unwanted lateral motion of the tortilla as it moves along the transfer guide. Accordingly, should any unwanted lateral displacement occur, the present invention advantageously moves the tortilla toward the center of curvature of the scalloped wall.

In one aspect of the invention, the curved wall of the transfer guide is defined by a plurality of laterally spaced, curved ribs. In yet another aspect of the invention, the curved ribs are joined, at their ends, to a support bracket positioned vertically above the plane formed by the upper surface of the upper conveyor.

The foregoing structural arrangement of the invention provides several important advantages. Chief among them is the advantage of relatively easier manufacturing due to the incorporation of the curved rib structure. The ribs of the transfer guide can be fabricated from straight pieces, such as 3/16" diameter stainless steel rods, joined by any common fastening process, such as welding, brazing, and adhesive or mechanical fastening. After the initial joining, the straight ribs can then be easily bent to form scalloped shapes. This method of fabrication requires less tooling and heavy equipment as compared to stamping or casting processes, either of which could be required to fabricate scalloped shapes from a solid wall of material.

Another advantage offered by the ribbed structure is the improved heat dissipation characteristics applicable to cooling applications. Generally, a typical cooling rack would be made up of a tier of conveyors collecting baked tortillas from the exit of a commonly available commercial oven. As compared to a transfer guide constructed from a solid wall of material, the ribbed transfer guide can dissipate more heat due to the spaces between its ribs. Accordingly, a faster cooling rate can be achieved.

Yet another advantage offered by the ribbed structure is the weight savings associated with the spaces provided for between the ribs. As compared to a transfer guide constructed from a solid wall of material of the same thickness as the ribs, the ribbed transfer guide would weigh less. Accordingly, because the ribbed transfer guide weighs less, it is relatively easier to mount and less costly to ship.

Yet another advantage offered by the ribbed structure is the ability to separate small unwanted dough pieces, such as crumbs or broken pieces of tortilla, from the stream of properly formed tortillas. The removal of such unwanted pieces of dough is desirable because such dough pieces can accumulate within the conveyor tier and may necessitate more frequent cleaning. Furthermore, in general, consumers may be less likely to purchase a bag of tortillas having small tortilla pieces and crumbs within plain view. As compared to a transfer guide constructed from a solid wall of material, the ribbed transfer guide has space between its ribs to allow for the advantageous exit of such unwanted dough pieces from the food production process.

It will be appreciated that, while the transfer guide of the present invention is especially adapted for use with disk shaped dough pieces, such as tortillas, the invention may also work with dough pieces of any shape. Accordingly, the transfer guide could be used in conjunction with dough pieces of any shape required to successfully manufacture a desired food product. Furthermore, while the transfer guide of the present invention is used in conjunction with two endless belt conveyors, the transfer guide can be used in conjunction with any apparatus which is capable of moving objects within a food processing system.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings.

DETAILED DESCRIPTION OF THE PREFERRED EMBODIMENT

Figure 1:
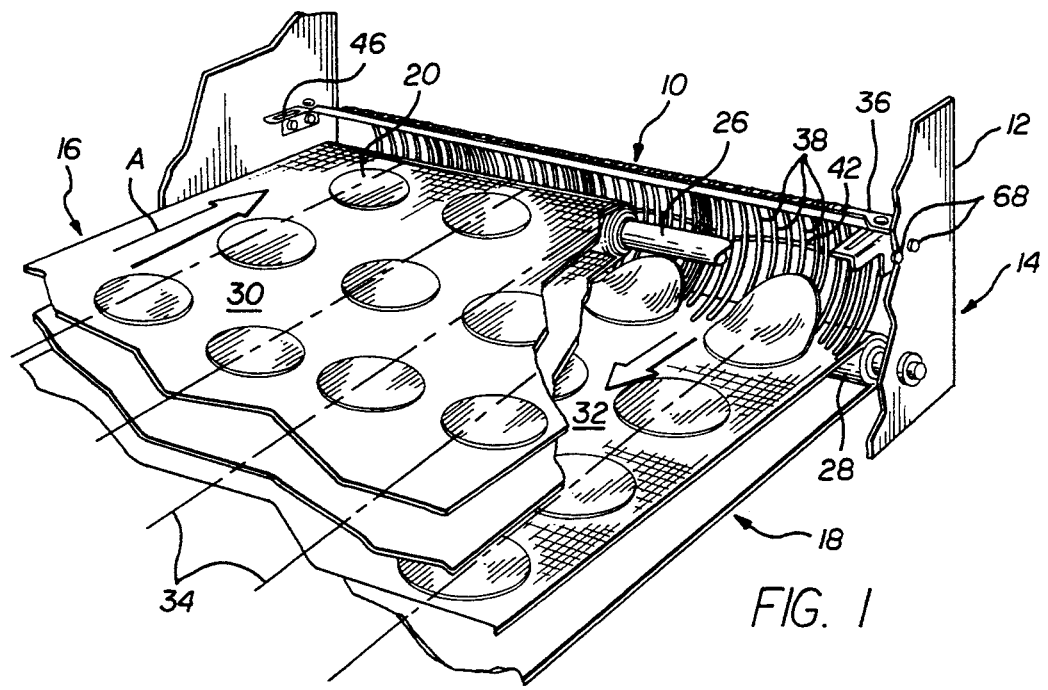
FIG. 1 is a perspective view of a transfer guide mounted adjacent to the drive ends of an upper and a lower endless belt conveyor; the upper endless belt conveyor is shown partly in cutaway section.

Referring to FIG. 1, the present invention is preferably embodied in a tortilla transfer guide, generally referred to by the reference numeral 10, for connection to the frame 12 of a tier 14 including vertically spaced endless belt conveyors, 16 and 18. In this particular application, the tier 14 including vertically spaced conveyors 16 and 18 is a cooling apparatus for tortillas 20 expelled from the exit of a typical commercial baking oven 22. The conveyors 16 and 18 move the tortillas 20 so that they are cooled by contact with room-temperature air. Unless otherwise noted, all parts are constructed from stainless steel.

The preferred tortilla transfer guide 10 (FIG. 1) is mounted laterally across the frame 12 of a tier 14 containing the two generally parallel conveyors 16 and 18 arranged in a vertically spaced relationship. The tortilla transfer guide 10 has four scallops 24 extending laterally and mounted with their concave, or dished, sides facing the conveyors 16 and 18. The tortilla transfer guide 10 requires a device to feed the tortillas into it and a device to move the tortillas away from its exit.

The conveyors 16 and 18 are driven to move the tortillas 20 to and from the tortilla transfer guide 10. Each conveyor 16 and 18 has drive rollers 26 and 28; both of which can be driven by any commonly known drive motor in combination with a common gear or drive belt arrangement (not shown). The respective upper surfaces 30 and 32 of both conveyors 16 and 18 are wide enough to accommodate four generally parallel rows of tortillas 20. Each row of tortillas 20 has an associated longitudinal axis 34, along which the tortillas 20 are intended to travel. The tortilla transfer guide 10 has a horizontal top bracket 36 joined to a plurality of curved ribs 38 which define a generally curved path from the upper conveyor 16 to the lower conveyor 18. In this regard, it is noted that the preferred tortilla transfer guide 10 is especially adapted for use with horizontal endless belt conveyors arranged in a vertically tiered relationship. However, it will be understood that the tortilla transfer guide of the present invention can be adapted for use with any suitable conveyor arrangement including one or more conveyor sections. Furthermore, the tortilla transfer guide of the present invention can also be used in conjunction with other conveying devices such as, but not limited to, chutes, slides, or other powered or non-powdered apparatus. Therefore, the invention is not intended to be limited in any way by the conveying means placed at the entrance and exit of the transfer guide. The tortilla transfer guide 10 has a unique structural arrangement which fosters the alignment of each tortilla 20 with its proper row on the upper surface 32 of the lower conveyor 18.

Figure 2:
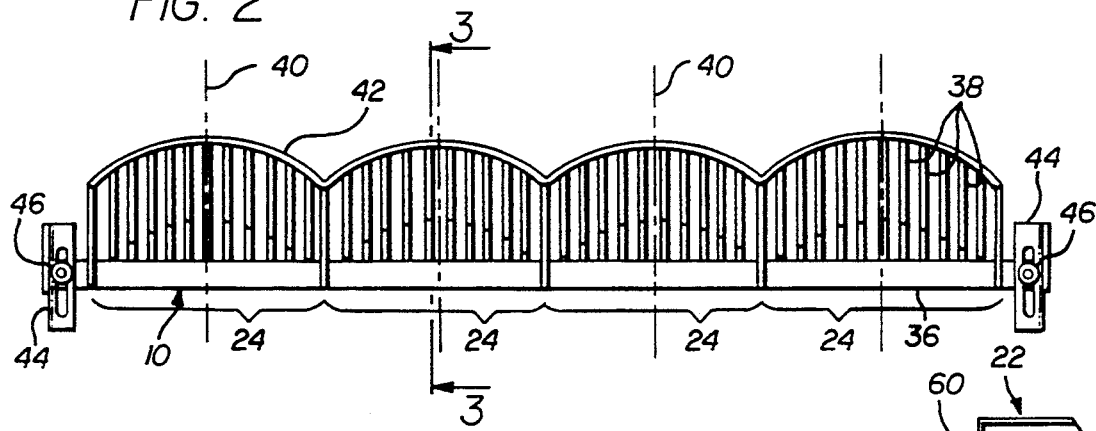
FIG. 2 is a bottom view of the transfer guide shown illustrated in FIG. 1.

The preferred tortilla transfer guide 10 (FIG. 2) has a plurality of laterally spaced, curved ribs 38 which form four scallops 24 which foster proper tortilla 20 alignment. Each scallop has a center of curvature 40 for alignment with an associated longitudinal axis 34 of a row of tortillas 20 on the upper conveyor 16 and with an associated longitudinal axis 40 of a row of tortillas 20 on the lower conveyor 18. The ribs 28 are welded to a horizontal support 42 and a top bracket 36 which forms the entrance to the tortilla transfer guide 10. The curved ribs 38 and the horizontal support 42 are both preferably constructed from 3/16" diameter stainless steel rod. The horizontal support 42 is shaped in four arcs, each corresponding with the cross-section of the scallops 24 along a horizontal line located generally halfway along the tortilla transfer guide 10. On each end of the top bracket 36, a mounting bracket 44 is fastened by a bolt 46. Each curved rib 38 is bent in a deliberate manner to enable the formation of the scallops 24.

Figure 3:
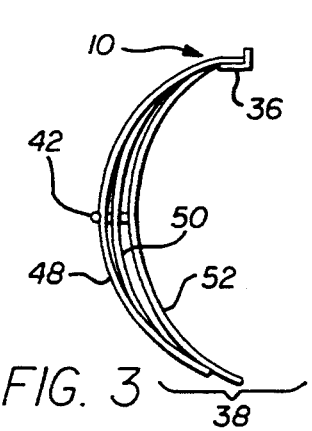
FIG. 3 is a partial cross sectional view of the transfer guide shown in FIG. 2. Only three ribs are shown for clarity purposes.

The scalloped shape 24 (FIG. 3) of each section is provided by a plurality of curved ribs 38 which have differing arcs so that a scallop 24 having a center of curvature 40 is formed. For the sake of clarity, only three ribs 48, 50, and 52 are shown joined to the top bracket 36. As seen in this view, the top bracket 36 has an "L" shaped cross section with the inner back of the "L" welded to the curved ribs 38. The center rib 48 is bent farther away from the conveyors 16 and 18 as compared to the other ribs 50 and 52, which are bent in increasingly tighter arcs. Because the curved ribs 50 and 52 and 56 toward the lateral edge of each scallop are bent in tighter arcs, the horizontal support 42 has the arced shape shown in FIG. 2. The three dimensional shape formed by this arrangement of the ribs 38 is generally referred to as "scalloped." Note that the horizontal support 42 is welded or otherwise joined to the convex side of all the ribs 38 along a horizontal plane generally vertically midway between the conveyors 16 and 18. In regard to the method used to join the ribs 38, top bracket 36, and horizontal support 42, welding is preferred, however, brazing, gluing, or mechanical fastening may also be utilized. If located properly, the tortilla transfer guide 10 can enable four rows of tortillas 20 to move through an entire tier 14 of conveyors.

Figure 4:
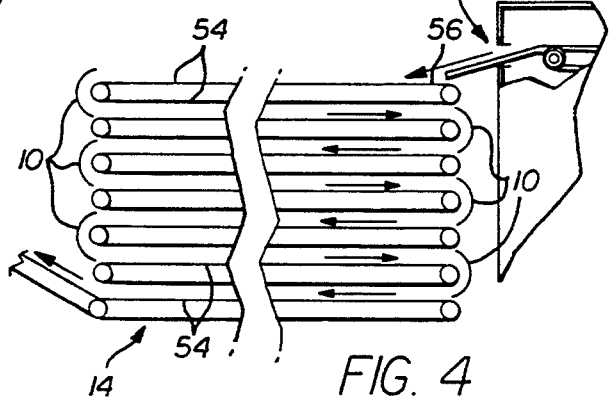
FIG. 4 is a schematic representation of a tier of endless belt conveyors showing the direction of movement from the exit of a commercial oven to the end of the tier.

To enable the continuous movement of four rows of tortillas 20 through a tier 14 (FIG. 4), the tortilla transfer guide 10 is placed adjacent to the end of each conveyor 54. Note that, in this particular embodiment, the conveyors 54 are generally parallel and spaced vertically. The entrance of the tier 14 is generally located on the top conveyor 56, which is adjacent to the exit of a common commercial oven 58. The exit of the tier 14 is located at the bottom left hand corner of the tier 14. While nine conveyors 54 are shown within the tier 14, a tier can have any number of conveyors. Generally, for cooling purposes, the number of conveyors required will increase with the humidity of the room temperature air. In a high humidity location, more conveyors are needed because the cooling rate is correspondingly less than the cooling rate which could be achieved in a low humidity location. Unlike the stationary drive rollers 26 and 28, the position of the idler rollers (not shown) of each conveyor 54 often must be moved longitudinally for tension adjustment purposes. Accordingly, the tortilla transfer guide 10 must be affixed to the tier 14 by two different methods.

To account for the longitudinal movement of the idler rollers (not shown), the tortilla transfer guide 10 is mounted to the structure of supporting the idler end (not shown) of the conveyors 54. Accordingly, two idler brackets 60 are required to mount the transfer guide 10 adjacent to the idler ends of the conveyors (not shown) and two drive brackets 44 are required to mount the transfer guide 10 adjacent to the drive ends of the conveyors 16 and 18. Both mounting brackets 44 and 60 are attached to the top bracket 36 of the tortilla transfer guide 10 by a nut 62, a bolt 46, and a lock washer 64. Both mounting brackets 44 and 60 feature long oval holes 66 so that the location of the tortilla transfer guide 10 can be adjusted with respect to the conveyors 16 and 18. Finally, both types of mounting brackets 44 and 60 should be mounted so that the top bracket 36 of the tortilla transfer guide 10 is spaced vertically above the upper conveyor 16. The differences between the two types of mounting brackets 44 and 60 will now be discussed.

Figure 5:
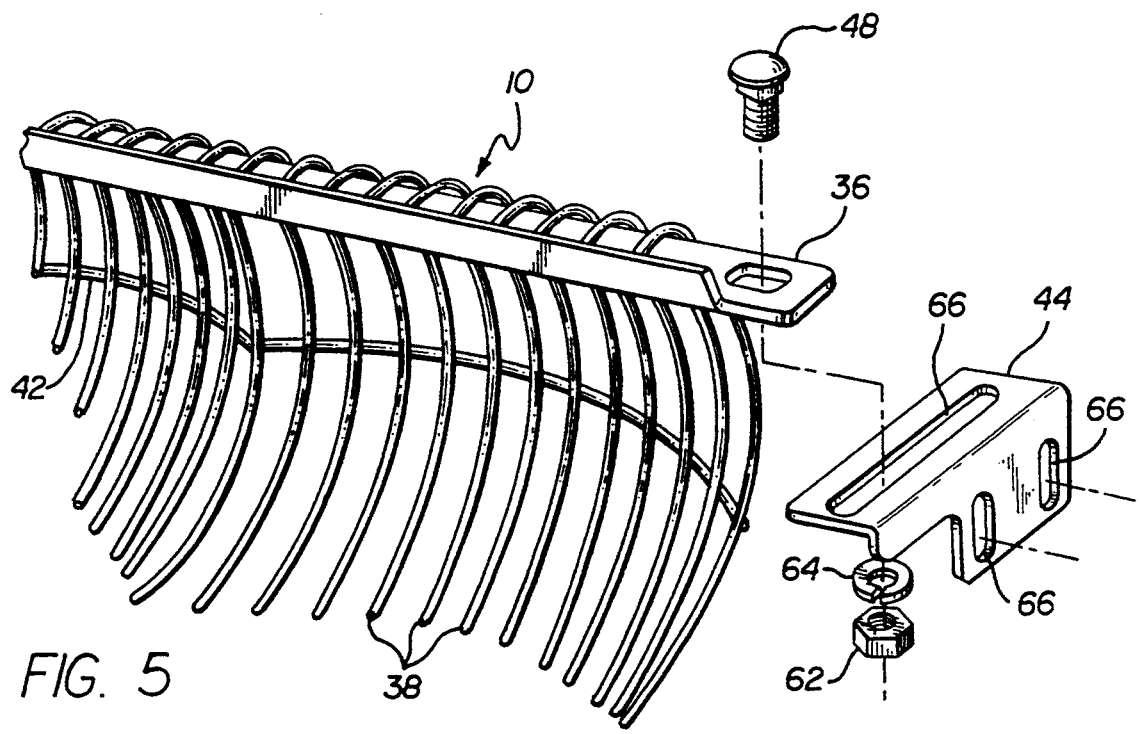
FIG. 5 is a partially exploded perspective view of the end of a transfer guide with a mounting bracket suitable for mounting the transfer guide adjacent to the drive ends of two endless belt conveyor.

The drive mounting bracket 44 (FIG. 5) attaches directly to the frame 12 of the tier 14 and is intended for mounting the preferred tortilla transfer guide 10 adjacent to the drive rollers 26 and 28 of the conveyors 16 and 18. As best illustrated in FIG. 1, the drive mounting bracket 44 is attached by bolts 68 extending through the holes 66, which are aligned with holes (not shown) in the frame 12 of the tier 14.

Figure 6:
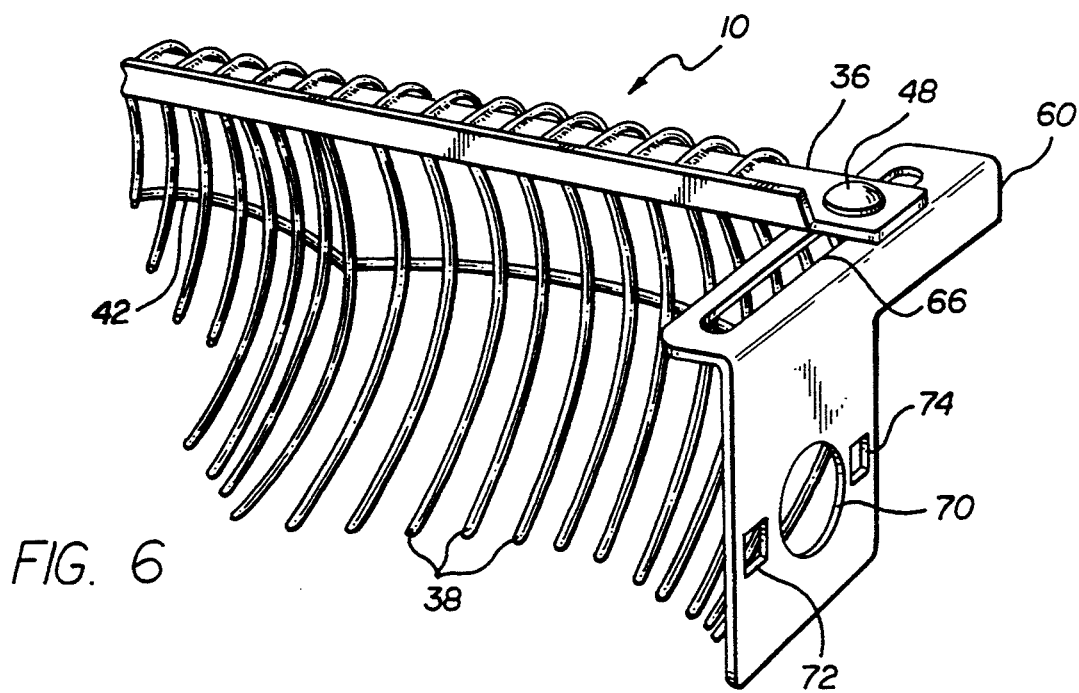
FIG. 6 is a partially exploded perspective view of the end of a transfer guide with a mounting bracket suitable for mounting the transfer guide adjacent to the idler ends of two endless belt conveyors.

The idler mounting bracket 60 (FIG. 6) attaches directly to the end of a conveyor and is intended for mounting the preferred tortilla transfer guide 10 adjacent to the idler rollers of the conveyors (not shown). The idler mounting bracket 60 has a circular center hole 70 to allow the proper clearance for the commonly known axle structure of the idler roller (not shown). Two horizontally aligned square holes 24 and 26 are provided for on each side of the center hole 70 to accept bolts which fasten to the supporting structure around the idler axle of conveyor (not shown) which is intended to feed the tortilla transfer guide 10. Because the idler mounting bracket 60 is mounted adjacent to the idler roller instead of to the tier frame 12, the tortilla transfer guide 10 will stay aligned with the idler end of the conveyor (not shown) as routine longitudinal tension adjustments are made. Upon proper mounting of the tortilla transfer guide 10, each scallop functions in a manner to advantageously guide each tortilla 20.

Figure 7:
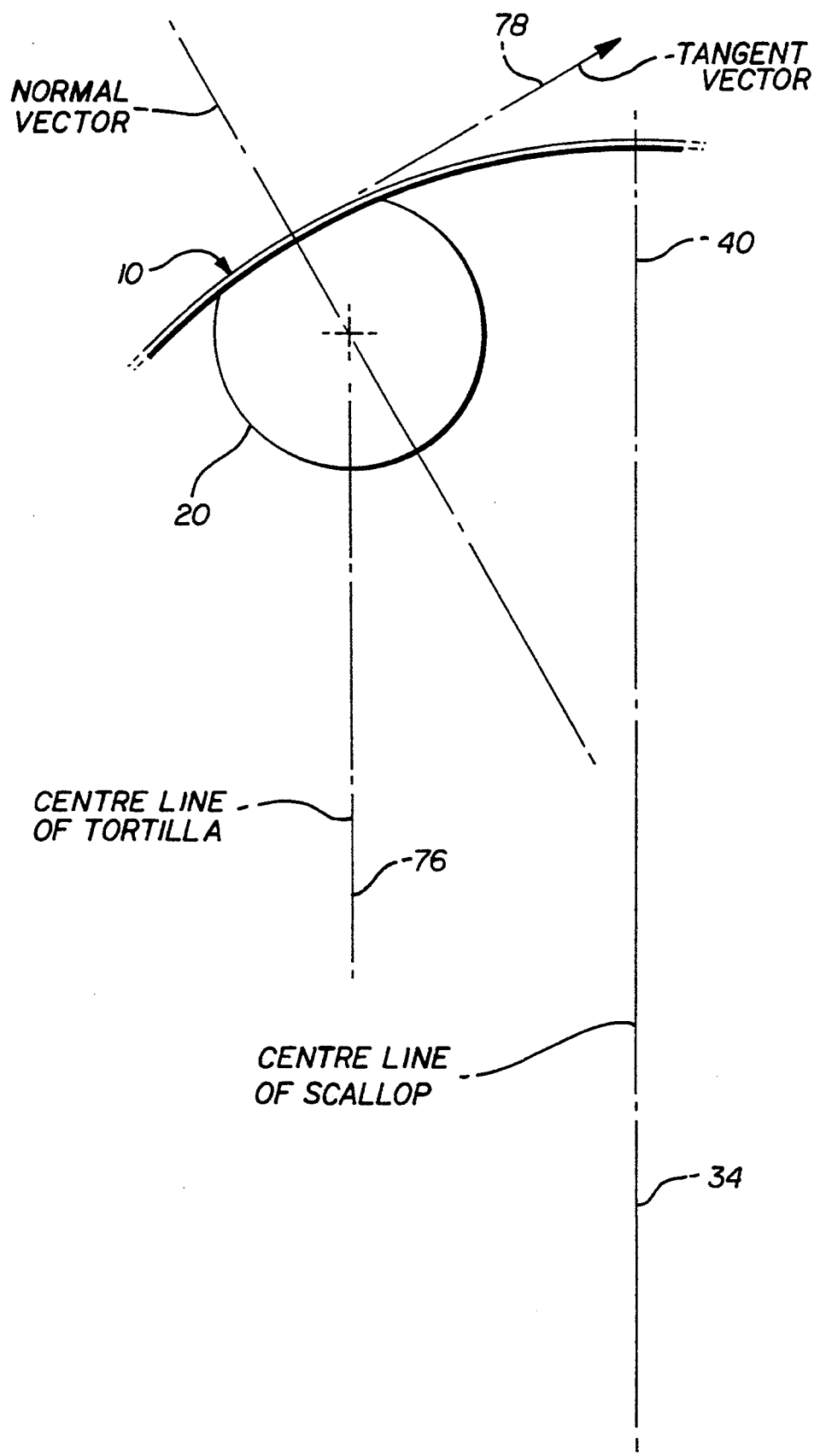
FIG. 7 is a top view of a free body diagram schematically illustrating a misaligned tortilla which has impacted with a portion of a scalloped wall of the transfer guide, shown in cross section.

To help illustrate the advantageous function of each scallop, a schematic free body diagram (FIG. 7) shows a laterally misaligned tortilla 20 in partial contact with the curved wall of a scallop 24. The scallop 24 has a center of curvature 40 which is aligned with an associated longitudinal axis 34 of a row along which tortillas 20 are intended to travel on the upper conveyor 16. In addition, the center of curvature 40 is also aligned with an associated longitudinal axis 34 of a row along which tortillas 20 are intended to travel on the lower conveyor 18. The diagram does not show the curved ribs for the sake of simplicity and clarity. The longitudinal axis 76 represents the travel path of the laterally misaligned tortilla 20. The word "lateral" as used herein refers to a distance in the direction perpendicular to the longitudinal axes 34 of the parallel rows of tortillas 20. A tangential force vector 78 is shown where the tortilla 20 is contacting the scallop 24. After having described the static position of a laterally misaligned tortilla 20, the discussion should be set into motion, so to speak, and focus on the dynamic operation of the tortilla transfer guide 10.

The operation of the tortilla transfer guide 10 is set into motion when the upper surface 30 of the upper conveyor 16 moves four rows of laterally spaced tortillas 20 along a path coinciding with the longitudinal axis 34 of each row. The tortillas 20 are moved along the upper conveyor 16 in the direction of the tortilla transfer guide 10, as indicated by arrow A. As the tortillas 20 approach the transfer guide 10, side 1 is facing upwards and is cooled by the room temperature air. As each tortilla 20 enters the scallop 24 associated with the longitudinal axis 34 of the tortilla's 20 row, the side 1 of the tortilla 20 is thrust against the curved ribs 38. After each tortilla 20 has slid around on the curved ribs 38, the tortilla 20 is deposited on the upper surface 32 of the lower conveyor 18 in alignment with the associated longitudinal axis 34 of the row along which the tortilla 20 is intended to travel on the lower conveyor 18. The side 1 of the tortilla 20 is thrust onto the upper surface 32 of the lower conveyor 18, thus allowing for side 2 to become exposed and cool accordingly. Additional tortilla transfer guides 10 can be utilized for each additional conveyor required for a particular application. While the operation of the tortilla transfer guide 10 seems relatively simple thus far, the complex function of the scallops 24, along with its numerous advantages, has yet to be described.

One such advantage is the guiding action of the scallops 24 (FIG. 7), which will now be described in more detail. Each scallop 24 has a center of curvature 40 aligned with an associated longitudinal row axis 34 along the upper surface 30 of the upper conveyor 16. Each scallop's 24 center of curvature 40 is also aligned with an associated longitudinal row axis 34 along the upper surface 32 of the lower conveyor 18. When a laterally misaligned tortilla 20 enters a scallop 24, the scallop 24 causes the tortilla 20 to move toward that scallop's 24 center of curvature 40 and exit the transfer guide 10 in alignment with the proper associated longitudinal row axis 34 of the upper surface 32 of the lower conveyor 18. This movement of the tortilla 20 towards the scallop's 24 center of curvature 40, while not precisely understood, may be attributable, at least in part, to several factors. One such factor may be the tangential force 78 imparted by the scallop 24 to the laterally misaligned tortilla 20. This tangential force vector 78 may cause the tortilla 20 to move towards the center of curvature 40, thus fostering proper alignment once the tortilla 20 reaches the upper surface 32 of the lower conveyor 18. A second factor may be the tendency of the tortillas 20 to spin into proper alignment with the center of curvature 40 of the scallop 24. Upon impact with the transfer guide 10, the curvature of the scallop 24 wall can allow the tortilla 20 to rotate or spin on its edge towards the center of curvature 40 of the scallop 24. A third possible factor may be attributable to the bouncing of the tortilla 20 off of the scallop 24. Upon impact with the scallop, the resilient properties of the dough may allow the tortilla 20 to bounce toward the center of curvature 40 of that particular scallop 24.

Another advantage is associated with the tortilla transfer guide's 10 ability to foster the alignment of laterally spaced tortillas 20 travelling at high velocities. As discussed above, when a tortilla 20 travels at a high velocity through a downward, semicircular turn, a variety of factors may interact to cause unwanted lateral movement. Thus, it is possible for a properly aligned tortilla 20 to move laterally while it is on the transfer guide 10. Once again, due to the tendency of the tortilla 20 to move towards the center of curvature 40 of the scallop 24, the present embodiment of the invention advantageously offsets any unwanted lateral motion of the tortilla 20 as it moves along the transfer guide 10. Accordingly, should any unwanted lateral displacement occur, the scallop 24 advantageously moves the tortilla 20 toward proper alignment with the center of curvature 40 of the scallop 24. The scallops 24 are not the only source of advantages offered by the tortilla transfer guide 10; the curved ribs 38 which define the scallops 24 have several associated advantages.

The laterally spaced ribs 38 (FIGS. 1,2, and 3) offer several advantages over other alternative structural arrangements. Chief among them is the advantage of relatively easier manufacturing due to the incorporation of the curved rib 38 structure. The ribs 38 of the transfer guide 10 can be fabricated from straight pieces of material, preferably 3/16" diameter stainless steel rods, joined to the other components by any common fastening process, such as welding, brazing, adhesive or mechanical fastening. After the initial joining, the straight ribs 38 can then be easily bent to form scallops 24. This method of fabrication requires less tooling and heavy equipment as compared to stamping or casting processes, either of which could be required to fabricate scallops 24 from a solid wall of material.

Another advantage offered by the curved ribs 38 is the improved heat dissipation characteristics applicable to cooling applications. Generally, a typical cooling rack would be made up of a tier 14 of conveyors collecting baked tortillas 20 from the exit of a commonly available commercial oven 22. As compared to a transfer guide constructed from a solid wall of material, the ribs 38 provide for lateral spaces which advantageously dissipate more heat. Accordingly, a faster cooling rate can be achieved.

Yet another advantage offered by the curved ribs 38 is the weight savings associated with the spaces provided for between the ribs 38. As compared to a transfer guide constructed from a solid wall of material of the same thickness as the ribs, the ribbed transfer guide 10 weighs less. Accordingly, because the ribbed transfer guide 10 could weigh less, it is relatively easier to mount and less costly to ship.

Yet another advantage offered by the curved ribs 38 is the ability to separate small unwanted dough pieces (not shown), such as crumbs or broken pieces of tortilla, from the stream of properly formed tortillas 20. The removal of such unwanted pieces of dough is desirable because such dough pieces can accumulate within the conveyor tier 14 and may necessitate more frequent cleaning. Furthermore, in general, consumers may be less likely to purchase a bag of tortillas having small tortilla pieces and crumbs within plain view. As compared to a transfer guide constructed from a solid wall of material, the ribbed transfer guide 10 has space between its ribs 38 to allow for the advantageous exit of such unwanted dough pieces from the food production process.

Although the preferred tortilla transfer guide 10 is especially suited for use with tortillas 20 or similar disk shaped dough pieces, the invention may also be used for guiding other objects. Furthermore, while the preferred tortilla transfer guide 10 of the present invention is shown in conjunction with two endless belt conveyors 16 and 18, the invention can be used in conjunction with any apparatus which is capable of moving objects within a food processing system.

It should be appreciated from the foregoing description that the present invention provides a tortilla transfer guide that successfully guides laterally spaced rows of tortillas between two conveyors so that the tortillas exit onto the lower conveyor with the proper lateral spacing.

While a particular form of the invention has been illustrated and described, it will be apparent that various modifications can be made without departing from the spirit and scope of the invention. Accordingly, it is not intended that the invention be limited, except as by the appended claims.

We claim:

1. A transfer guide for use in an oven or cooling apparatus for heating or cooling tortillas, the apparatus being of the type including a pair of generally horizontal, vertically spaced, endless belt conveyors, each passing around an associated one of two vertically spaced rollers, wherein the tortillas are fed onto the upper conveyor for movement, in alignment with laterally spaced, longitudinal axes to dispose the tortillas in parallel rows along the upper surface of the upper conveyor, the upper surfaces of the upper and lower conveyors travelling relatively toward and away from the transfer guide, respectively, the transfer guide intended to guide the tortillas in each row from the upper conveyor to the upper surface of the lower conveyor in a manner that causes alignment of each tortilla with one of the parallel longitudinal axes associated with the row along which the tortilla is intended to travel on the upper surface of the lower conveyor, the transfer guide comprising, a vertically and laterally extending curved wall spaced from and facing towards the adjacent ends of the two conveyors, said wall positioned to receive the tortillas from the upper surface of the upper conveyor and guide them down and around in a generally curved path onto the lower conveyor; and at least one scallop formed by said wall extending laterally therein and dished away from the adjacent conveyors, said scallop having a center of curvature aligned with one of the longitudinal axes along which the tortillas travel in their rows, said scallop, upon contact by a tortilla which is laterally displaced from the center of curvature of said scallop, tending to move the tortilla toward that said scallop's center of curvature as the tortilla passes from the upper conveyor to the lower conveyor thereby fostering alignment of each tortilla with the longitudinal axis of the row along which the tortilla is intended to travel on the upper surface of the lower conveyor.

2. The transfer guide as defined in claim 1, wherein said curved wall is defined by a plurality of laterally spaced, curved ribs.

3. The transfer guide as defined in claim 2, wherein said curved ribs are joined at their ends to a support bracket positioned vertically above the plane defined by the upper surface of the upper conveyor.

4. The transfer guide as defined in claim 3, wherein said curved ribs are also joined to a reinforcing member along a series of points vertically between the upper surface of the upper conveyor and the upper surface of the lower conveyor.

5. The transfer guide as defined in claim 4, wherein said curved ribs and said reinforcing member are constructed from stainless steel.

6. A transfer guide for use in an oven or cooling apparatus for heating or cooling tortillas, the apparatus being of the type including a pair of generally horizontal, vertically spaced, endless belt conveyors, each passing around an associated one of two vertically spaced rollers, wherein the tortillas are fed onto the upper conveyor for movement, in alignment with laterally spaced, longitudinal axes to dispose the tortillas in parallel rows along the upper surface of the upper conveyor, the upper surfaces of the upper and lower conveyors travelling relatively toward and away from the transfer guide, respectively, the transfer guide intended to guide the tortillas in each row from the upper conveyor to the upper surface of the lower conveyor in a manner that causes alignment of each tortilla with one of the parallel longitudinal axis associated with the row along which the tortilla is intended to travel on the upper surface of the lower conveyor, the transfer guide comprising, a vertically and laterally extending curved wall spaced from and facing towards the adjacent ends of the two conveyors, said wall positioned to receive the tortillas from the upper surface of the upper conveyor and guide them down and around in a generally curved path onto the lower conveyor; and a plurality of scallops formed by said wall extending laterally therein and dished away from the adjacent conveyors, each scallop having a center of curvature aligned with one of the longitudinal axes along which the tortillas travel in their rows, each said scallop, upon contact by a tortilla which is laterally displaced from the center of curvature of said scallop, tending to move the tortilla toward that said scallop's center of curvature as the tortilla passes from the upper conveyor to the lower conveyor thereby fostering alignment of each tortilla with the longitudinal axis of the row along which the tortilla is intended to travel on the upper surface of the lower conveyor.

7. The transfer guide as defined in claim 6, wherein said curved wall is defined by a plurality of laterally spaced, curved ribs.

8. The transfer guide as defined in claim 7, wherein said curved ribs are joined at their ends to a support bracket positioned vertically above the plane defined by the upper surface of the upper conveyor.

9. The transfer guide as defined in claim 8, wherein said curved ribs are also joined to a reinforcing member along a series of points vertically between the upper surface of the upper conveyor and the upper surface of the lower conveyor.

10. The transfer guide as defined in claim 9, wherein said curved ribs and said reinforcing member are constructed from stainless steel.

11. A method of transferring tortillas utilizing a transfer guide within a commercial food processing apparatus, the commercial food processing apparatus being of the type including a pair of generally horizontal, vertically spaced, endless belt conveyors and a transfer guide, each conveyor passing around an associated one of two vertically spaced aligned rollers, wherein the tortillas are intended to be fed onto the upper conveyor for movement, in alignment with laterally spaced, longitudinal row axes to dispose the tortillas in parallel rows along .the upper surface of the upper conveyor, the transfer guide being of the type having a vertically and laterally extending curved wall spaced from and facing towards the adjacent ends of the two conveyors, to receive the tortillas from the upper surface of the upper conveyor and guide them down and around in a generally curved path onto the lower conveyor, the wall defining at least one scallop extending laterally therein and dished away from the adjacent conveyors, each scallop having a center of curvature aligned with one of the longitudinal row axes along which the tortillas travel in their rows, the method of transfer comprising the steps of, feeding laterally spaced tortillas onto the upper surface of the upper conveyor such that the tortillas are carried towards the transfer guide thereby forming parallel rows of spaced tortillas, each row of tortillas generally aligned with its longitudinal row axis;

arranging the scallops of the transfer guide to align the center of curvature of each scallop with its associated longitudinal row axis on the upper surface of the lower conveyor; and deflecting any tortillas which are laterally displaced from the center of curvature of any of the scallops towards that associated scallop's center of curvature as the tortillas pass from the upper conveyor to the lower conveyor, thereby fostering alignment of the tortillas with the associated longitudinal row axis along which they are intended to travel on the upper surface of the lower conveyor.

12. The method for transferring tortillas as defined in claim 11, wherein the curved wall of the transfer guide is constructed from a plurality of laterally spaced, curved ribs, the method further comprising the step of, cooling the tortillas as they move along the transfer guide by the dissipation of heat through the spaces between the ribs.

13. The method for transferring tortillas as defined in claim 11, wherein the curved wall of the transfer guide is constructed from a plurality of laterally spaced, curved ribs, the method further comprising the step of, separating smaller dough pieces from the stream of tortillas by the movement of the smaller dough pieces through the spaces between the ribs.

* * * * *